M. STEPHENS.
Cement Lined Pipes.

No. 137,970. Patented April 15, 1873.

Witnesses
Chas. H. Smith,
Harold Serrell

Inventor
Melvin Stephens,
Lemuel W. Serrell
atty.

UNITED STATES PATENT OFFICE.

MELVIN STEPHENS, OF BROOKLYN, NEW YORK.

IMPROVEMENT IN CEMENT-LINED PIPES.

Specification forming part of Letters Patent No. 137,970, dated April 15, 1873; application filed October 29, 1872.

*To all whom it may concern:*

Be it known that I, MELVIN STEPHENS, of Brooklyn, Kings county, New York, have invented an Improvement in Cement-Lined Pipes, of which the following is a specification:

My invention consists in a cement-lined metal pipe, provided at one end with a short taper or cone, to enter a similarly-shaped recess in the cement of the next pipe, whereby the thin edges of the cement are protected by the metal, and when put together the ends are held in a correct relative position, and one pipe may diverge slightly from the line of the next. I also employ a ring that is placed edgewise of the metal around the sheet-metal pipe, to strengthen the same and prevent the external pressure injuring or misshaping the pipe.

Figure 2:
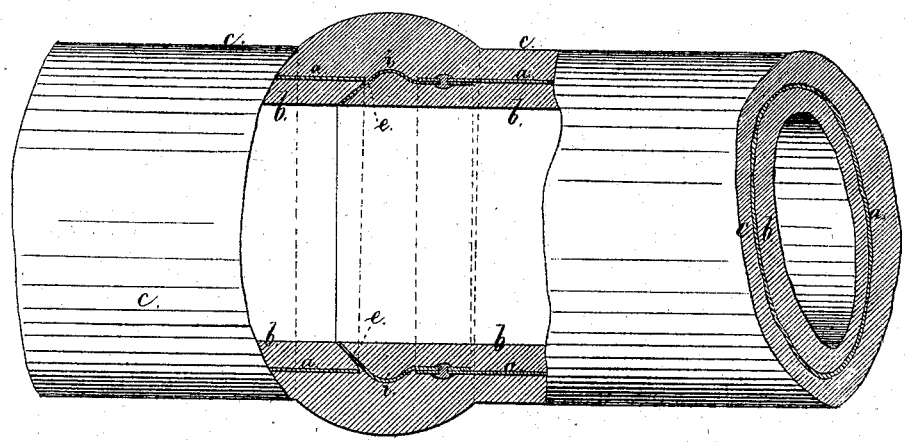
Figure 1:
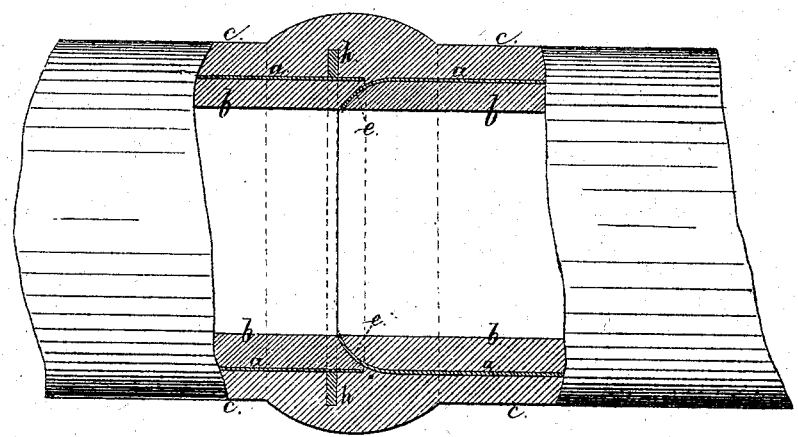

In the drawing, Figure 1 is a section of the joint with the tapering metallic end made as part of the sheet-metal pipe, and Fig. 2 is a similar view, with a separate tapering ring attached to the pipe.

The sheet-metal tube $a$, with the cement lining $b$, and exterior coating $c$, are of any desired character, except that at one end the cement-lining $c$ does not terminate square, but is recessed or tapered inwardly, and at the other end of the pipe the metal tube $a$ is contracted or tapered as at $e$ to enter the similarly-shaped recessed end of the next pipe, the parts being coated with cement before they are put together, and these conical or tapering portions guide the ends of the pipe, and steady them in their correct relative positions, while the joint is being made, either of cement alone, or of cement with an inclosing ring or band, and the exterior of the pipe is being coated with cement.

In Fig. 2 the tapering portion $e$ at the end of the pipe is upon a separate ring, that may be riveted to the pipe $a$, and to stiffen the joint still more the said ring may be bulged or made with a bead at $i$, or this bead may be upon the end of the pipe itself.

The metallic ring $h$ is made of a flat band rolled up edgewise, so that the edge of the metal will come in contact with the surface of the sheet-metal tube $a$, as seen in Fig. 1, and this ring, being very stiff, will support the metal pipe and prevent it being flattened or put out of shape by the pressure or weight of earth. This ring may be applied near the ends, or at one or more places along the pipe, and it may be placed within the pipe, if desired.

I do not claim a tapering or conical joint introduced within a cement-lined pipe, nor a cast-metal ring surrounding the sheet-metal into which the tap is screwed.

I claim as my invention—

1. The sheet-metal cylinder $a$, lined with cement and provided with a short taper or cone, $e$, at one end, the sheet metal covering the taper or cone of the lining and extending to the inner surface, or nearly so, of the lining, substantially as and for the purpose set forth.

2. The thin metallic ring $h$ applied edgewise to and combined with the metallic tube of a cement-lined pipe, for the purposes set forth.

Signed by me this 22d day of October, A. D. 1872.

MELVIN STEPHENS.

Witnesses:
GEO. T. PINCKNEY,
CHAS. H. SMITH.